June 18, 1929.　　　G. A. DE VLIEG　　　1,718,193
APPARATUS FOR GRINDING TOOLS
Filed Sept. 29, 1921　　　9 Sheets-Sheet 1

Inventor:
Gerard A.
DeVlieg

June 18, 1929. G. A. DE VLIEG 1,718,193
APPARATUS FOR GRINDING TOOLS
Filed Sept. 29, 1921 9 Sheets-Sheet 4

June 18, 1929.　　　　G. A. DE VLIEG　　　　1,718,193
APPARATUS FOR GRINDING TOOLS
Filed Sept. 29, 1921　　　9 Sheets-Sheet 5

Patented June 18, 1929.

1,718,193

UNITED STATES PATENT OFFICE.

GERARD A. DE VLIEG, OF JANESVILLE, WISCONSIN.

APPARATUS FOR GRINDING TOOLS.

Application filed September 29, 1921. Serial No. 504,020.

My invention relates to apparatus for grinding tools, and has for its object the provision of a new and improved grinding machine whereby the ground tools need not have their ground edges further dressed after they are ground.

The invention is of particularly service when employed in the grinding of reamer blades as by means of it such blades are provided with cutting edges that lie in cylindrical areas. The invention also provides means whereby the ends of the blades may have the portions of the cutting edges therein ground upon lines that taper from the aforesaid cylindrical area.

In the preferred embodiment of the invention the grinding instrument is an emery wheel and the blades to be ground are upon a blade holder which may be a permanent part of the machine or which may be the identical blade holder which supports the blades in reaming operations.

The grinding wheel is desirably given a substantially fixed plane of rotation suitably inclined with respect to the blade holder for purposes which will later be set forth and the blade holder itself is also turned but is moved longitudinally of its axis in order that the various portions of the blade being ground may be properly presented to the grinding wheel to impart the proper shape to the cutting edge upon the blade that results from the grinding operation.

I will explain my invention more fully by reference to the accompanying drawings showing the preferred embodiment thereof as employed in a machine for grinding one form of reamer blade. In the drawings

Like parts are indicated by similar characters of reference throughout the different figures.

The machine illustrated is one which is adapted to the grinding of reamer blades employed, for example, in grinding the bores of cylinders, though of course the invention is not to be limited to the use to which the sharpened blades are to be put, nor is the invention to be limited to the sharpening of reamer blades.

The blade or work holder 1 has slots 2 cut therein, these slots lying in straight planes which are oblique to the axis of rotation of the work holder. This work holder may form a permanent part of the blade grinding machine or may be the identical work holder upon which the blades are mounted when they are put to service. So far as the invention is concerned it will be realized that there may be but one of the slots 2 in the work holder, a plurality being employed for economy in operation so that a number of blades may be subject to the grinding operation in each cycle of movements of the work holder. For the sake of clearness these slots are not shown in those figures which are more or less diagrammatic as extending clear through the work holder from end to end as such an illustration of the slots would serve greatly to confuse the diagrammatic illustrations.

Figures 25, 26:
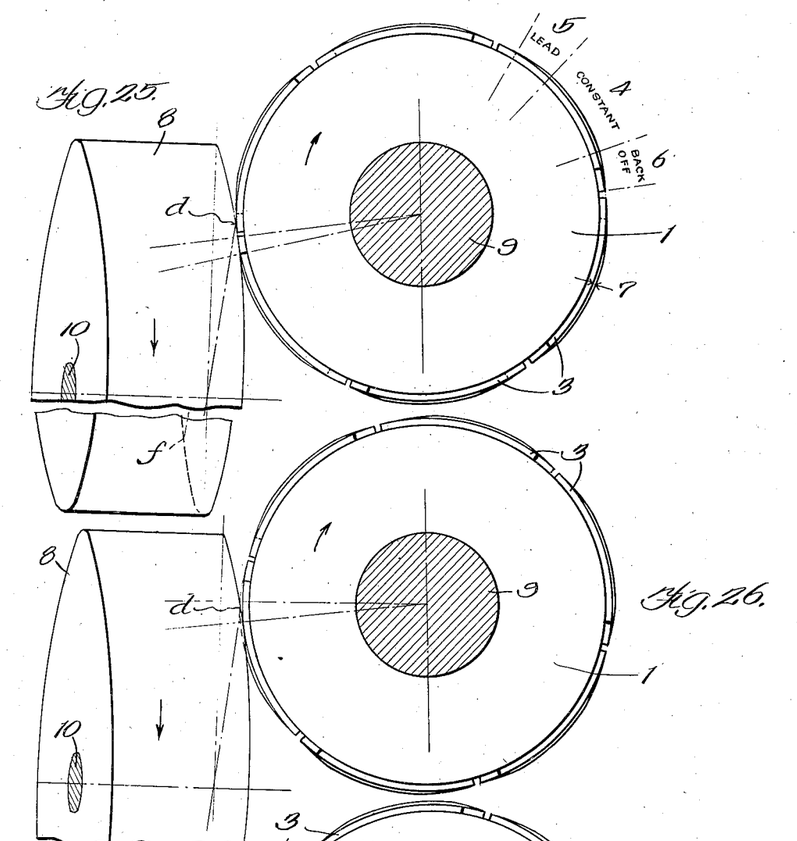
Figs. 25, 26 and 27 respectively indicate the work holder in full end elevation but turned to different positions in the course of the sharpening of a single blade, the grinder being illustrated in each of these figures also.
Figure 27:
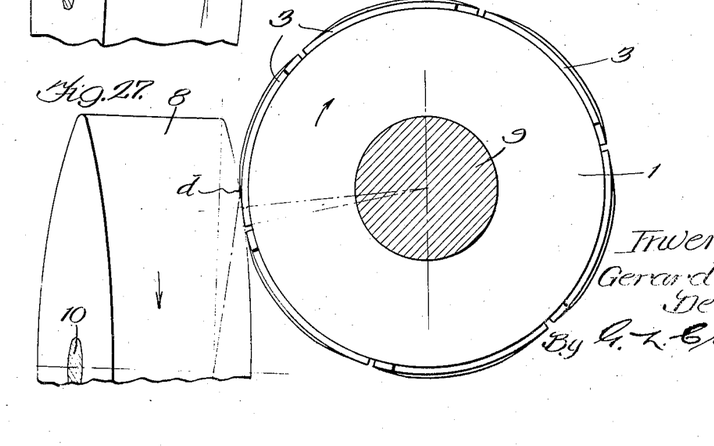

There are six such slots each containing a reamer blade 3. The machine illustrated is constructed and adjusted so to grind the reamer blades as to impart the desired cutting faces thereto and also to impart suitable shapes to the cutting edges of the blades, the cutting faces and edges of all the blades upon a given work holder being similar. The cutting edge of each blade illustrated has, after the grinding operation, an intermediate portion 4 (Fig. 25) that lies in a cylindrical area conforming to the area of the cylindrical surface which the blades are to form upon the interior of a cylinder. Each such cutting edge has one end portion 5 which is the first to enter into engagement with a cylinder that is to be reamed, this portion being termed the lead and tapering from the cylindrical area with which the portion 4 is coincident. The other end portion 6 of each cutting edge also tapers from said cylindrical area and is commonly termed the backoff. The cutting edge of each blade is thus a line that lies partially in a cylindrical area at its intermediate portion and in continuing end portions in areas that taper from such cylindrical area, but it is to be understood that the invention is not to be limited to the varying directions of the cutting edges nor to the grinding of the cutting edges altogether by the machine. Each blade is bevelled from its cutting edge toward the axis of the blade holder so as to produce the necessary clearance back of the cutting edge between the blade and the work upon which it operates, this bevelling being indicated at 7.

Figure 1:
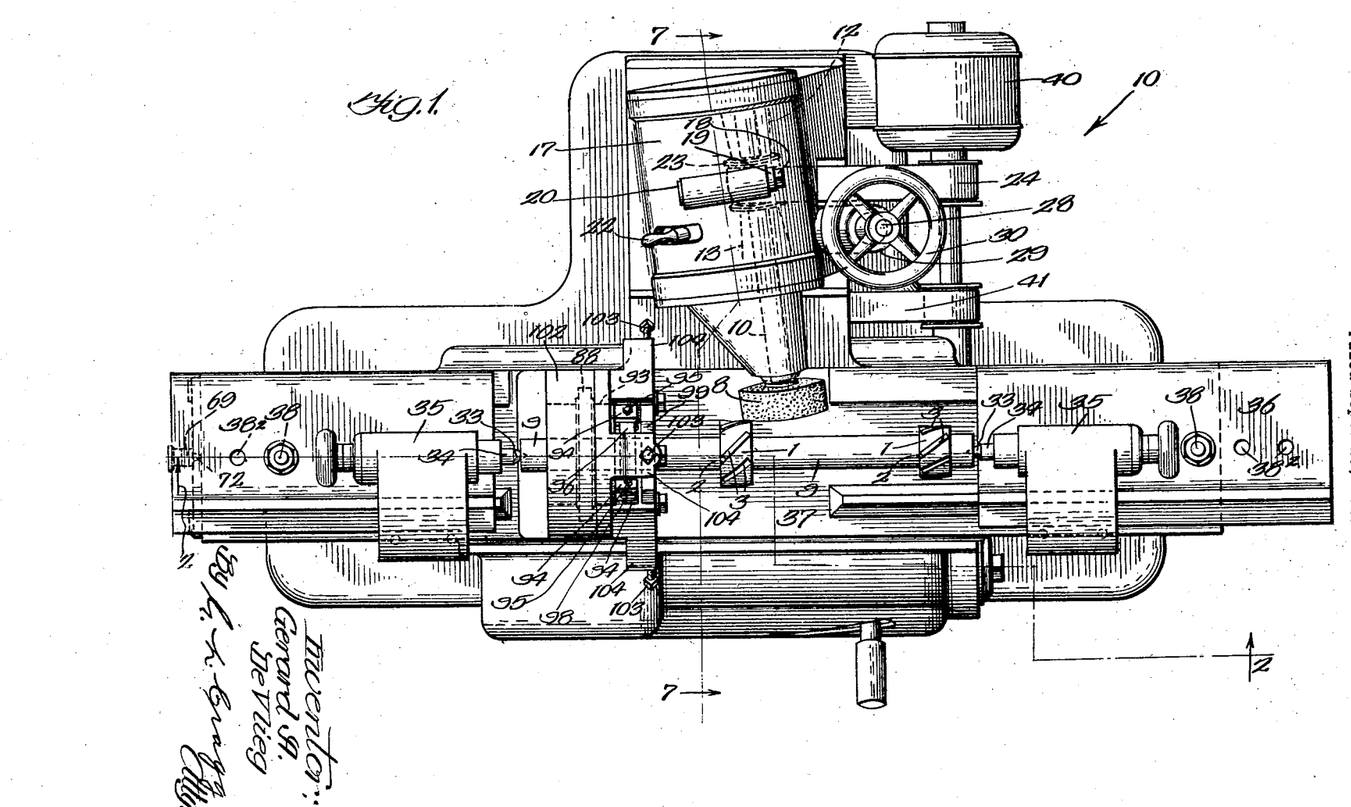
Fig. 1 is a plan view of such a machine.
Figure 2:
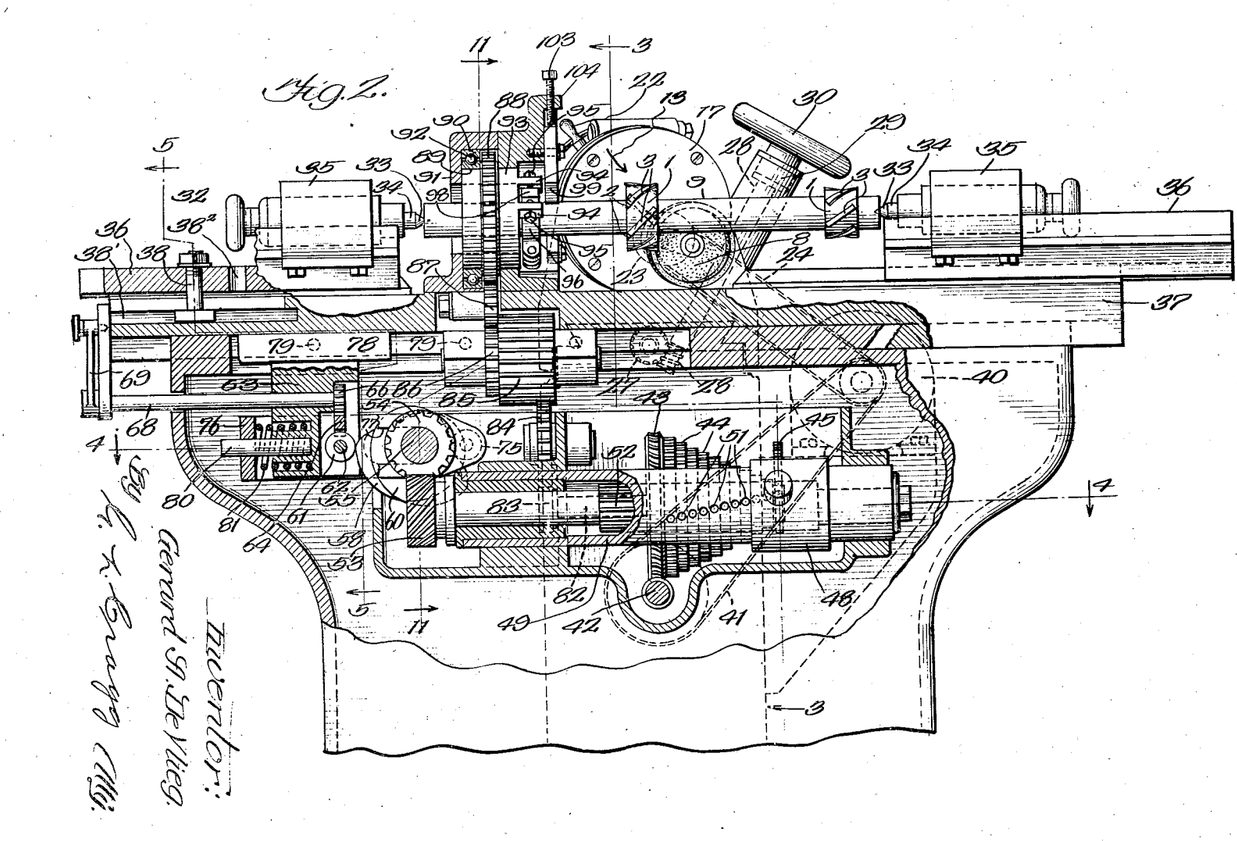
Fig. 2 is a sectional view on line 2—2 of Fig. 1.
Figure 3:
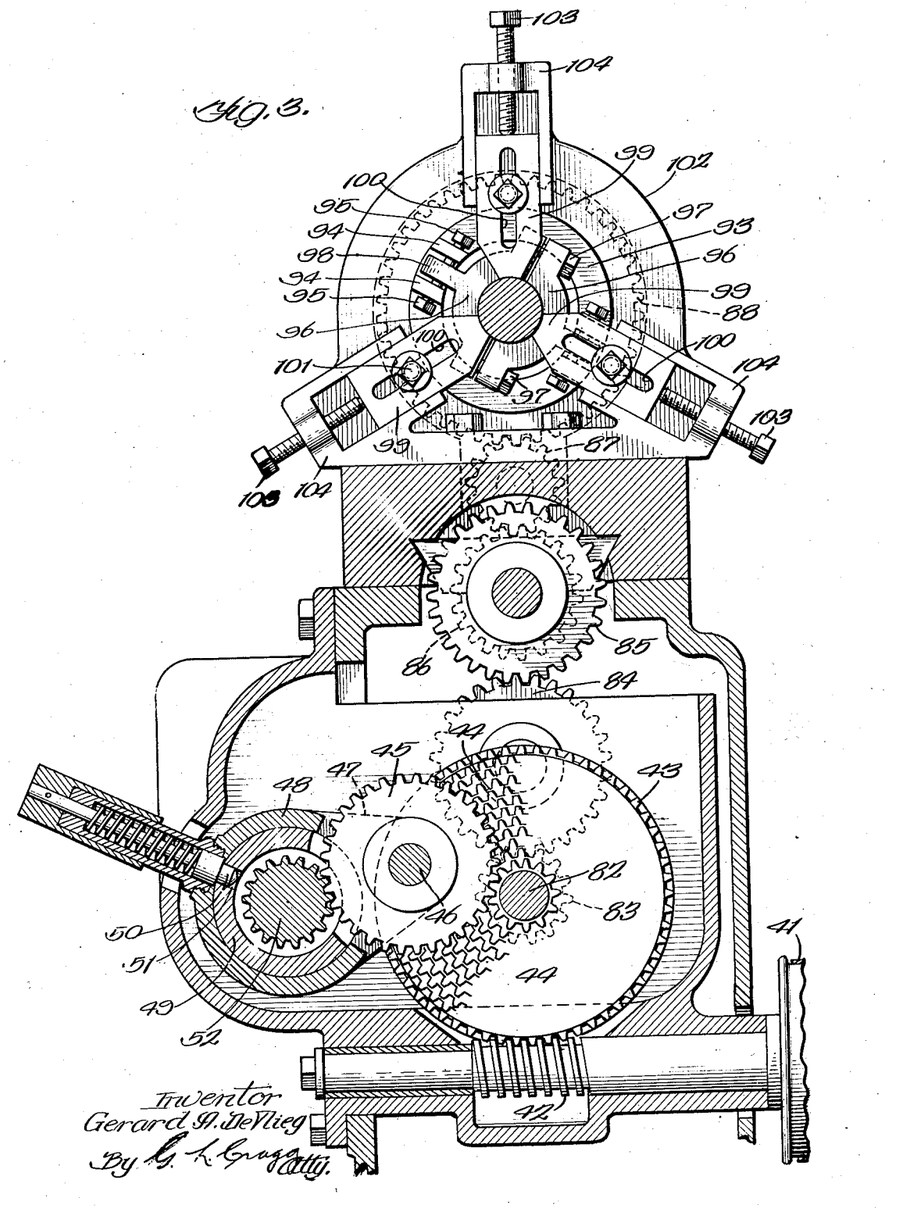
Fig. 3 is a sectional view on line 3—3 of Fig. 2.
Figures 4, 5, 6:
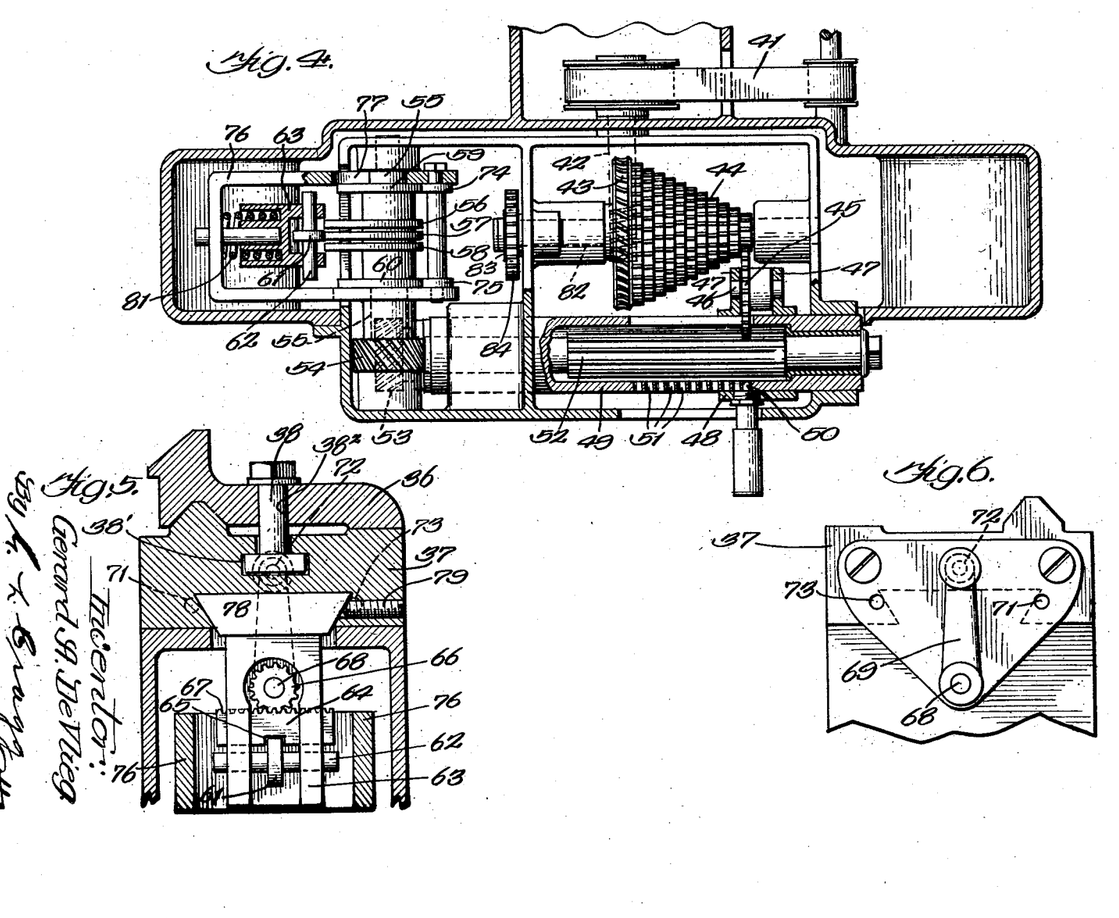
Fig. 4 is a sectional view on line 4—4 of Fig. 2.
Fig. 5 is a sectional view on line 5—5 of Fig. 2.
Fig. 6 is an end view at the left hand end of Fig. 2.
Figure 7:
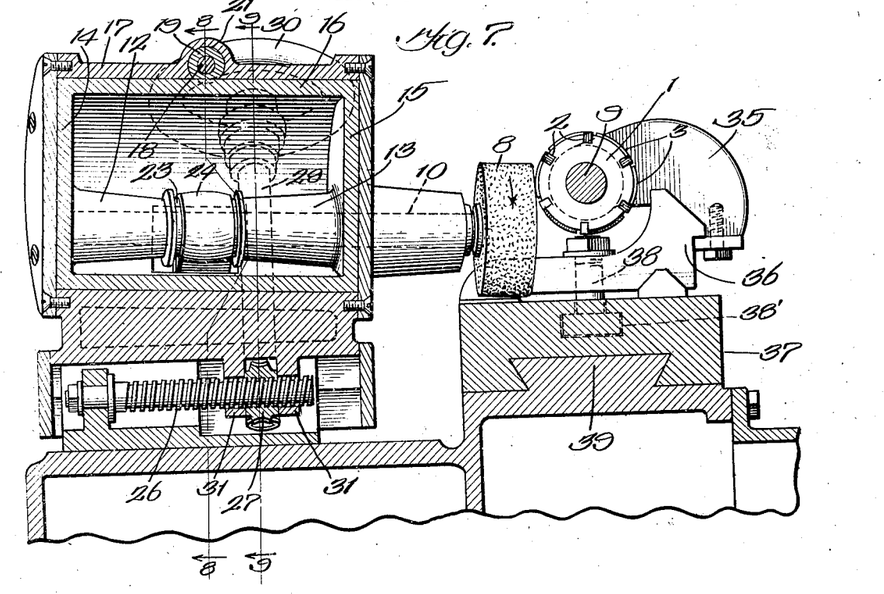
Fig 7 is a sectional view on line 7—7 of Fig. 1.
Figure 8:
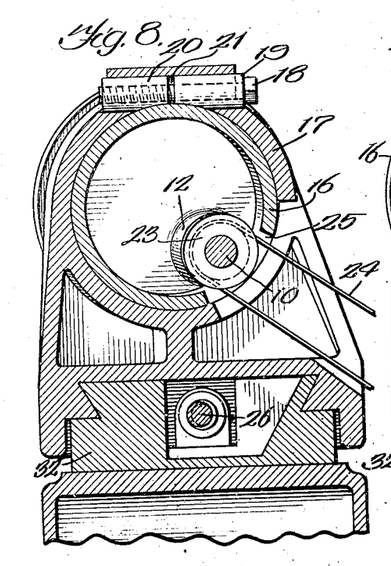
Fig. 8 is a sectional view on line 8—8 of Fig. 7.
Figure 9:
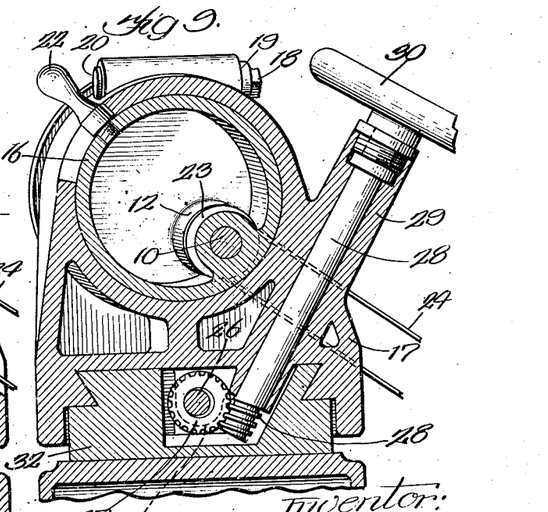
Fig. 9 is a sectional view on line 9—9 of Fig. 7.
Figures 10, 11, 12:
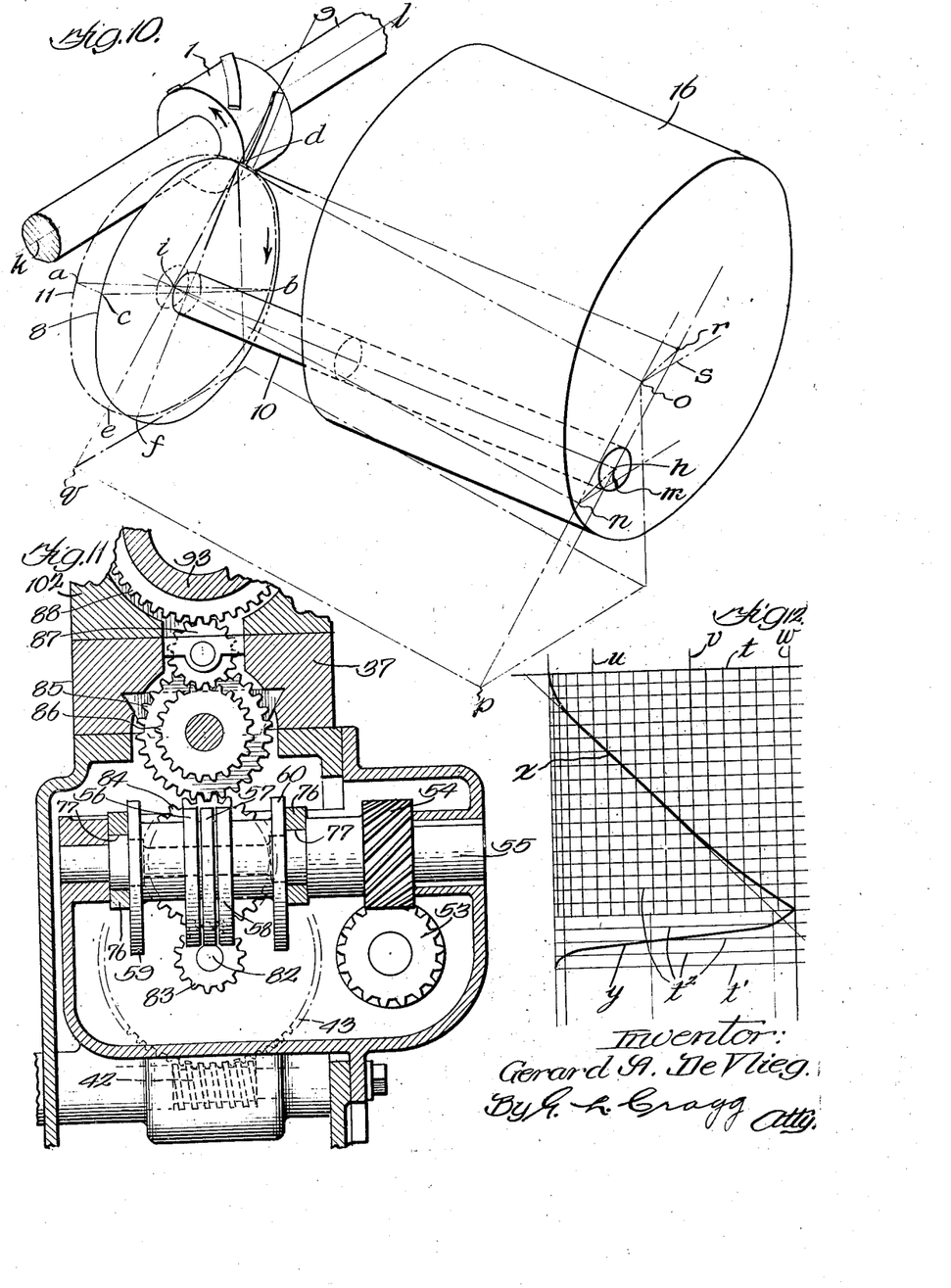
Fig. 10 is a diagrammatic view illustrating the relative dispositions of the work holder and grinding mechanism, the view being taken in the direction of arrow 10, Fig. 1.
Fig. 11 is a sectional view on line 11—11 of Fig. 2.
Fig. 12 is a motion chart.
Figure 13:
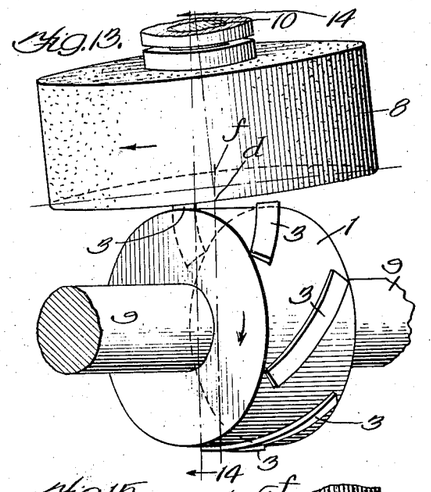
Fig. 13 is a view taken in a vertical plane in the direction of arrow 13, Fig. 2.
Figure 14:
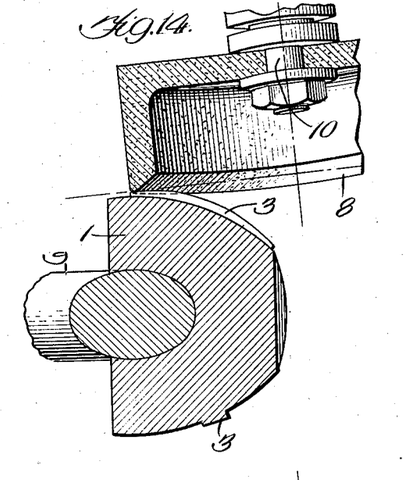
Fig. 14 is a sectional view on line 14—14 of Fig. 13.
Figure 15:
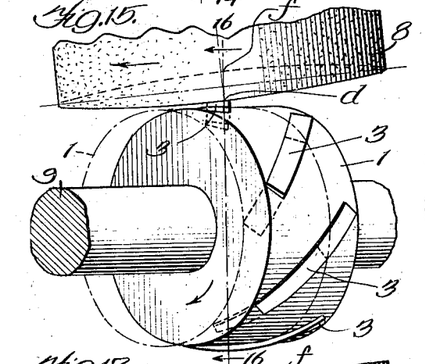
Fig. 15 is a view similar to Fig. 13 but showing the reamer blade or other work holder in a different position along its axis.
Figure 16:
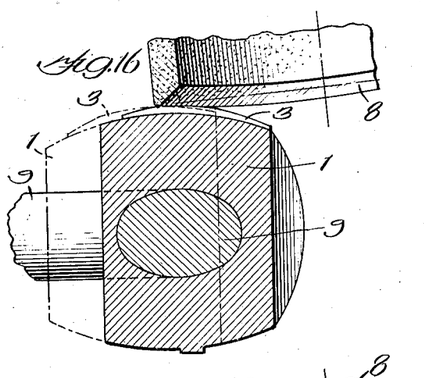
Fig. 16 is a sectional view on line 16—16 of Fig. 15.
Figure 17:
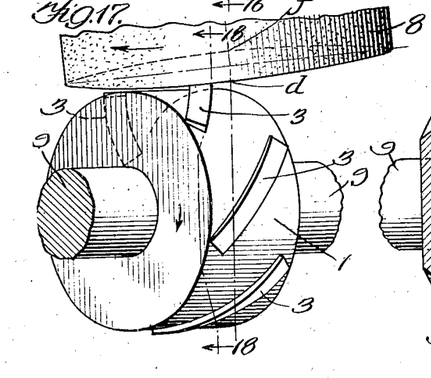
Fig. 17 is a view similar to Figs. 13 and 15 showing the work holder in still another position along its axis.
Figure 18:
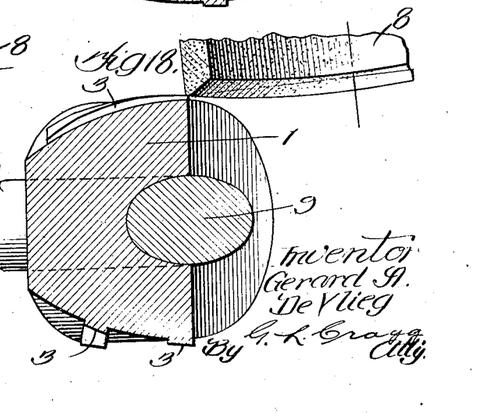
Fig. 18 is a sectional view on line 18—18 of Fig. 17.

The machine of my invention employs a blade grinding tool which is preferably in the form of emery wheel 8. This emery wheel and the blade holder are so related and relatively operated that the emery wheel has a line of grinding contact with each blade that is identical with the shape of the cutting edge of the blade which the grinding wheel is to form. To this end the shaft 9 upon which the blade holder is fixed is caused to turn in order that the blade holder may be turned and, while being turned, is also caused to move longitudinally of its axis of rotation. The shaft 10 upon which the grinding wheel is fixed is, however, preferably mounted so as to turn upon its axis without moving longitudinally thereof. The shaft of the grinding wheel is so disposed that the rear peripheral edge of the grinding wheel, this edge being represented by a single line in Fig. 10, has grinding contact with the blades, the rear face of the grinding wheel being cupped so that the grinding edge of the wheel may be easily sharpened when desired. The shaft of the grinding wheel is so mounted that the grinding edge is in grinding contact with each blade in a cord of the circle of rotation of the ground blade edge to produce the bevel 7. The plane of rotation of the grinding wheel that is defined for it for producing the bevel upon each blade is at an angle to the axis of the blade holder. In Fig. 10 a vertical plane is illustrated by dot and dash lines at 11 which is parallel with the horizontal axis of the work holder, the grinding wheel being inclined from the plane 11 to its true grinding plane at the angle $a\ b\ c$ to impart the desired bevelling of the blades. So far as the mere bevelling is concerned, the plane of rotation of the grinding wheel need only be inclined to the horizontal while remaining parallel with the axis of the blade holder but it is slightly inclined with respect to such axis in order that the grinding wheel may grind each blade without having any improper grinding contact with any succeeding blade upon the same holder or upon other holders that might be mounted upon the same shaft 2. The angularity which is imparted to the grinding wheel for this clearance purpose is defined by the angle $d\ e\ f$ in Fig. 10, the point $d$ being substantially the point of grinding contact of the wheel with the blade (the actual point of grinding contact slightly shifting as will later be described), the line to which the cutting edge of the blade is to conform passing through this fixed point $d$ by suitable longitudinal movement of the blade holder along the blade holder axis. The two angles $a\ b\ c$ and $d\ e\ f$ are such that the plane of the grinding wheel slopes downwardly and away from the blade holder to an extent that will cause the grinding edge of the grinding wheel to sweep over each blade being ground in lines that are substantially at right angles to the cutting edge of such blade throughout the length of the blade so that such cutting edge will be uniformly sharpened throughout its length which would not be the case if the grinding lines across its bevel face were not parallel and at right angles. The plane of rotation of the grinding wheel is preferably fixed but the blade holder or rather the shaft 9 of the blade holder is so mounted that it may be shifted longitudinally of its axis and shifting mechanism is employed, hereinafter to be set forth, whereby this shifting of the blade holder is so controlled that the line of grinding contact of the grinding wheel upon each blade as the blade holder is moved conforms exactly to the shape of the cutting edge that is to be produced while at the same time the proper bevel is being imparted to the blade owing to the shifting of the blade from the plane 11 through the angle *a b c*. Analyzing the diagram of Fig. 10 somewhat further, the shifting of the plane of rotation of the grinding edge of the grinding wheel from the vertical plane 11 through the angles *a b c* and *d e f* is such that the axis *h i* of the grinding wheel is inclined from the horizontal plane containing the axis *k l* of the blade holder, this inclination being measured by the angle *h i m* (the point *i* lying in the plane 11) and is at an angle to the vertical plane containing such work holder axis, this angle being the angle *m i n*. The point *n* would lie in the axis *h i* of the grinding wheel if the plane of rotation of this grinding wheel were vertical and parallel with the axis of the blade holder but since the plane of the grinding wheel is caused to be angular to the vertical plane containing the axis of the blade holder and slopes downwardly and away from such plane, the point *h* (which marks the relocation of the point *n*) is swung upon the center *i* the vertical distance *h m* and is also swung upon the point *i* the oblique distance *h n* whereby the plane of grinding contact of the wheel is disposed as described for the purposes set forth. The straight line including the point *i* and the point of contact of the grinding wheel 8 with the blade being sharpened is preferably at 45° to the horizontal with the particular blade inclination, this line lying in the plane 11 and being coincident with a diameter of the grinding plane of the cutting wheel 8 if this grinding plane were in the plane 11. This line and diameter shift with the shifting of the grinding plane of the wheel 8 but is still substantially at an angle of 45° to the horizontal but in a plane which is angular to the vertical plane containing the blade holder axis *k l* and slopes from the horizontal plane containing such blade holder axis. The plane 11 is tangential to the circle of rotation of the cutting edge of the blade. When this plane is shifted through the angle *a b c* (which is the bevelling angle) the plane of grinding contact of the wheel is on a cord of the circle of rotation of the cutting edge of the blade so as to bevel the blade. The diameter of the grinding wheel that includes the point *d* and the center of the grinding circle of the grinding wheel continue to lie in the plane *d o p q* that is adjusted to be at 45° to the horizontal, if the blades are mounted at 45° to the horizontal, the angularities of the plane *d o p q* and of the blades being coincident. As the grinding wheel is tilted the center of the grinding circle is maintained in the 45° plane or other plane that corresponds in angularity to the angularity of the blades to the horizontal.

The grinding wheel shaft 10 is journaled in the bearings 12 and 13 fixedly carried upon the end walls 14 and 15 of a cylinder 16 which is normally fixed within a holder 17, the axis of the cylinder and the axis of the grinding wheel shaft being parallel in all positions of the cylinder within its holder, as is obvious.

Whenever the cylinder is turned within its holder the shaft 10 is elevated or depressed according to the direction in which the cylinder is turned. The mechanism for holding the cylinder in its adjustment will later be set forth. The axis of the cylinder 16 substantially includes the substantially fixed grinding point *d*. If each blade happens to be at an angle to the horizontal less than that shown the cylinder 16 is turned to elevate the grinding wheel shaft 10. If each blade happens to be at an angle to the horizontal more than that illustrated the cylinder 16 is turned to lower the grinding wheel shaft 10. The grinding wheel shaft and the cylinder 16 being coupled as described, the axis of the cylinder 16 is shifted exactly as is the axis of the shaft 10 to maintain parallelism therewith, the angle *d o r* being similar to the angle *h i n*, the planes of these two angles being parallel; the angle *d r s* being similar to the angle *h i m*, the planes of these two angles being also parallel; and the angle *m i n* being similar to the angle *s o d*, the planes of these two angles likewise being parallel.

In the motion chart, Fig. 12, the time to complete one-sixth of a revolution of the blade holder is represented by the space between the lines *t* and *t'*, and the space between these two lines being evenly divided by the lines $t^2$ to denote uniform division of time as the rotation of the blade holder is preferably at a constant speed. The blade holder is moved along its axis to pass a blade along the grinding point *d* as the blade holder is turned and when each blade has been ground the blade holder is very rapidly returned and again is moved along its axis to pass the next succeeding blade along the grinding point *d* as the blade holder is turned. The rate of lineal travel of the blade holder during the grinding operation varies as is indicated by the upright lines in the motion chart. This rate increases in the initial part of the grinding operation until the upright line *u* is reached, whereby the back-off 6 is ground in the blade edge. The rate of lineal travel then continues constant until the upright line *v* is reached whereby the constant portion 4 of the cutting edge is produced, this constant portion lying within a cylindrical area. After this portion of the blade has been ground the rate of lineal travel of the blade holder increases until the line $w$ is reached whereby the lead 5 of the cutting edge is produced. Just after the lead portion 5 has been produced the blade holder is moved backward along its axis at a very rapid rate so as to place the succeeding blade in position to be ground when the blade holder is again moved in a blade grinding direction. The heavy line $x$ denotes the resultant of the rotation and lineal movement of the blade holder in the grinding operation and shortly prior to and subsequent to such grinding operation, the grinding commencing shortly after the line $x$ is commenced and the grinding being finished shortly before such line is concluded. The heavy line $y$ shows the resultant of the turning movement and the very rapid reverse lineal movement of the blade holder preparatory to the grinding operation upon an ensuing blade. Adjacent blades upon the blade holder are in spaced apart zones, the line $y$ being generated during the rapid return movement of the blade holder while the space between the adjacent zones is traversing the fixed point $d$.

Any suitable means may be employed for holding the cylinder 16 in its adjustment. In the preferred embodiment a bolt 18 is employed that freely passes through a sleeve 19 into threaded connection with an elongated nut 20, the portions 19 and 20 being located within a space 21 formed in an enlargement of the holder 17 and into which space a peripheral portion of the cylinder 16 projects so as to be engageable by the sleeve 19 and the nut 20 on the opposite sides of a diametrical line. By turning the bolt 18 in one direction or the other the nut and sleeve may be spread apart to free the cylinder 16 to permit its adjustment or may be brought together to hold the cylinder 16 in its adjustment according to the direction in which the bolt is turned. For convenience the cylinder 16 may be provided with a handle 22 to enable the cylinder to be turned when the bolt 18 is loosened.

The shaft 10 has a pulley 23 fixed thereon over which a driving belt 24 passes in order to drive the shaft, this belt passing through a gap 25 in the cylinder 16.

The grinding wheel 8 is bodily adjustable toward and from the blade holder 1 along horizontal lines that respectively include the center $i$ and the point $d$, the lines followed in this bodily adjustment of the grinding wheel being respectively the lines $i\ n$ and $d\ o$. This adjustment permits the grinding wheel to operate upon blades held in holders of different diameters. Any new location of the point of grinding contact with the blades is in a horizontal line that intersects the axis of the blade holder whereby the timing of the cams, that are later to be described, that control the various operations, is not disturbed. The mechanism for effecting the adjustment of the grinding wheel toward and from the blade holder is preferably inclusive of a stationary threaded shaft 26 mounted upon the frame of the machine. The nut 27 is in mesh with the shaft 26. This nut is formed with worm threads upon its exterior surface that constitute it a worm wheel. These work threads are engaged by the threads upon an adjusting shaft 28 which is mounted to turn in a bearing 29 carried by the cylinder holder 17. A wheel 30 is fixed upon the upper end of the shaft 28. By turning this wheel the worm wheel 27 is turned and as the shaft 26 is fixed, this worm wheel will move along such shaft as said wheel is turned. The wheel is snugly received in the space between the lugs 31 that depend from the holder 17 so that said holder, together with the cylinder 16 therein, the shaft 10 mounted in the cylinder, and the grinding wheel are together moved toward or from the blade holder whenever the wheel 27 is turned. The base portion of the holder has a dovetailed recess which receives a dovetailed guide 32 that is stationary upon the frame of the machine whereby the holder may readily be moved along the guide that keeps the holder from turning and permits it to move along the guide.

The shaft 9 of the blade holder is itself mounted between and upon the conical bearings 33 formed upon the inner ends of the shafts 34 that are mounted in the tail stocks 35 which are clamped on the tables 36 that are themselves clamped upon the opposite ends of the single table 37 by means of bolts 38, the tables 36 having sliding engagement with the table 37 so that the tables 36 may be adjusted along the table 37 to permit of the insertion of substituted shafts 9 whether these shafts are of the same or different lengths. The heads of said bolts are receivable within a longitudinal grooveway 38' formed in the table 37 so that the bolts, being loosened, may move with the tables 36 as they are adjusted along the table 37. To permit extended adjusting movement of the tables 36 along the table 37 the tables 36 may have a number of bolt holes $38^2$ arranged along the tables in any of which said bolts may be placed. The table 37 that supports both tables 36 itself has dovetailed mortise and tenon connection 39 with the base of the machine to permit the table 37 to be moved along the axis of the shaft 9 in one direction as the blade is being ground and in a reverse direction after the grinding of each blade preparatory to the grinding of the next blade. The arrangement is such that a shaft with a plurality of blade holders may be located between the tail stocks, these tail stocks being adjusted along the table 37 in order properly to locate the particular blade holder whose blades are to be ground in suitable relation with the grinding wheel.

Any suitable mechanism may be employed for imparting reciprocal movements to the table 37, these movements being slow in one direction during the grinding operation and quicker in the reverse direction for the reasons stated. The power for operating the machine is preferably derived from a motor 40 which not only drives the belt 24 that turns the grinding wheel shaft 10, but also drives the belt 41 that in turn drives the shaft 42 which serves, through the intermediation of suitable transmission mechanism, to reciprocate the bed 37. The shaft 42 is a worm shaft in mesh with the worm wheel 43 that is in fixed relation with a spur gear cone 44 any of whose spur gears is engageable with a spur gear 45 of proper size fixed upon the shaft 46 mounted in bearings 47 constituting fixed extensions of a sleeve 48 which itself surrounds a sleeve 49 and is slidable along the same but is normally held in fixed relation therewith by means of the inwardly spring pressed plunger 50 carried by the sleeve 48 and engageable with any of the holes 51 that are distributed along the sleeve 49 and are in the planes of the various spur gears 44. This arrangement permits of the employment of gear wheels 45 of different sizes for engagement with gears 44 of corresponding sizes to regulate the relative rates of revolution of the cone 44 and the pinion (45) upon the shaft 46 so that the gear 52 in mesh with such pinion 45 may have its rate of rotation likewise adjusted in relation to the rate of rotation of said gear cone 44. The gear 52 is elongated so that it may be engaged by the gear 45 wherever this gear is disposed to have meshing engagement with the gear 44 corresponding to it. A worm gear 53 is co-axial with and fixed with respect to the elongated gear 52 and is in mesh with another worm gear 54 that is fixed upon the shaft 55 which carries cams 56, 57 and 58, any one of these cams alone being employed in effecting the longitudinal movement of the table 37 during the grinding operation. The cams are of different shape to effect different rates of movement of the table 37, that cam being selected for use according to the rate of movement that is to be effected. Other cams 59 and 60 are also fixed upon the shaft 55 and jointly serve to effect the reverse movement of the table 37, the cams 59 and 60 thus co-operating with one or the other of the cams 56, 57 and 58 in effecting reciprocable movement of the table 37. The rate of travel of the table 37 that is controlled by the selected cam 56, 57 or 58 and the cams 59 and 60 is primarily controlled by the particular spur gear 44 which is employed to drive the gear 52 that drives the shaft 55. The selected cam 56, 57 or 58 performs its functions through the intermediation of the cam roller 61 which is adjustable into the plane of rotation of the selected cam preferably by being mounted upon a shaft 62 which is adjustable longitudinally of its axis in a forked bearing 63. The mechanism for adjusting the cam roller 61 and its shaft 62 along the common axis of these two elements preferably includes a notched block 64 which is mounted to slide in the bearing 63 along the axis of the shaft 62. This block 64 is formed with a notch 65 that receives the periphery of the roller 61 so that as the block 64 is moved along the axis of this roller the roller is correspondingly moved. The range of movement of the block 64 is such that the roller 61 may be placed in the plane of rotation of either of the cams 56, 57 or 58. The means for adjusting the block 64 preferably includes a pinion 66 in mesh with rack teeth 67 formed upon the top side of the block. This pinion is mounted upon a shaft 68 that carries a crank handle 69. The outer end of this crank handle carries an inwardly spring pressed plunger 70 that is engageable within either of the holes 71, 72, 73 respectively corresponding to the cams 56, 57 and 58. When the handle is turned to place the plunger 70 in the selected hole the cam roller is placed in the plane of rotation of the selected cam whereby the final adjustment of the speed of travel of the table 37 in the grinding operation is effected. The restoring cams 59 and 60 operate upon the cam rollers 74 and 75. These cam rollers are mounted to turn upon the U-shaped support 76 having slots 77 through which the shaft 55 passes and transversely of which shaft said U-shaped support is movable. The bearing 63 is fixedly mounted upon and below the table 37 but is formed with a dovetailed tenon 78 receivable within the corresponding mortise in said table whereby the fixed position of the bearing 63 with respect to the table may be adjustably determined along the table. A clamping bolt 79 carried upon the table may be turned into gripping engagement with the tenon portion 78 of the bearing 63 to hold the bearing in the position to which it is adjusted. The bearing 63 also carries a guide pin 80 that passes through the base of the U-shaped support 76, this pin co-operating with the shaft 55 in positioning the support 76 and in guiding this support in movements transverse to the shaft 55. A spring 81 is interposed between the base of the U-shaped support 76 and the bearing 63, this spring serving to press the support 76 outwardly to maintain the cam rollers 74 and 75 in engagement with the cams 59 and 60 respectively. The spring 81 serves to press the roller 61 toward one side of the shaft 55 and the rollers 74 and 75 toward the other side of the shaft, the spring thus functioning to press all the rollers into engagement with the cams complemental thereto.

Figures 19, 20, 22, 23:
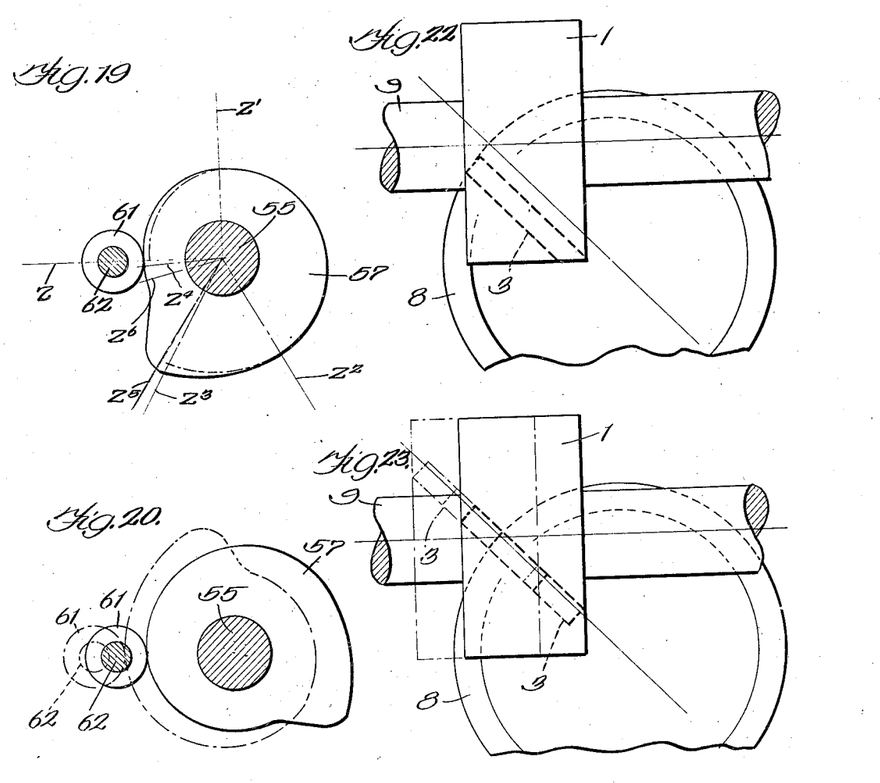
Fig. 19 shows the cam mechanism that controls the position of the work holder along its axis, parts of the cam mechanism being in the position which cause the location of the blade or work holder which is illustrated in Figs. 13 and 14.
Fig. 20 shows the cam mechanism of Fig. 19 with its parts in two other relative positions, the relative positions indicated by full lines being that which accompanies the adjustment of the work holder shown in full lines in Figs. 15 and 16 and the positions shown by dot and dash lines being that which accompanies the adjustment of the work holder shown by dot and dash lines in said Figs. 15 and 16.
Figs. 22, 23 and 24 are other views showing the relations of the work holder and grinder that respectively accompany the relative positions of the cam parts shown in Figs. 19, 20 and 21.
Figures 21, 24:
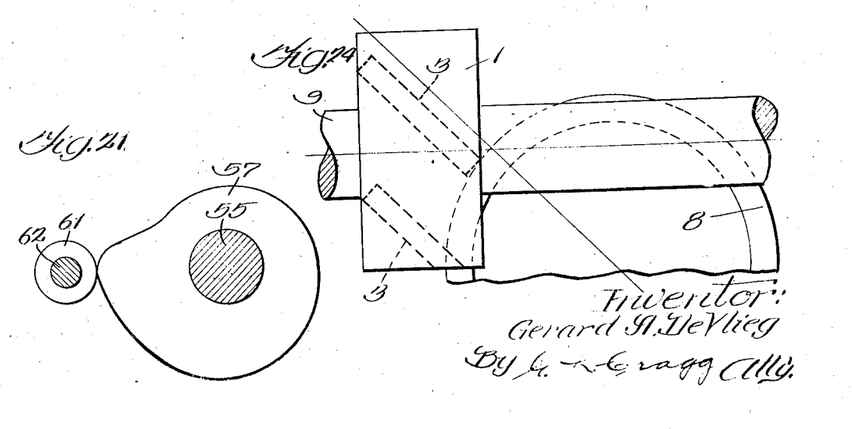
Fig. 21 shows the cam mechanism with its parts in the relative positions resulting in the adjustment of the work holder shown in Figs. 17 and 18.

The action of either of the cams 56, 57 and 58 is diagrammatically indicated most clearly in Fig. 19 which illustrates the action of cam 57. The portion of this cam from the place where it is shown in engagement with the cam roller 61 to the highest portion of the cam effects such an increasing longitudinal movement of the shaft 9 to grind one end of the blade, finally causing the elevation of the point of grinding contact to grind the higher or constant portion of the cutting edge of the blade. After this portion of the blade has been cut or ground the place of grinding contact is gradually lowered to complete the grinding.

The shaft 9 is constantly turned at a uniform rate of speed, in the preferred embodiment of the invention, during all movements of the table 37. This shaft is turned by the worm gear 43 and suitable transmission mechanism which is driven by this worm gear. This transmission mechanism includes the shaft 82 upon which the worm 43 is fixedly mounted, the pinion 83 fixed on the shaft 82, the gear wheel 84 in mesh with the pinion 83, the gear 85 journaled upon and beneath the table 37, this gear being elongated so that it may remain in mesh with the gear 84 as the table 37 is reciprocated (the gear 84 having a fixed plane of rotation), the gear 86 fixed upon and co-axial with the gear 85, the pinion 87 also travelling with the table 37, being rotatably mounted by means of a ball bearing structure including an inner raceway 89 fixed upon one side of the gear 88, an outer raceway 90 fixed upon a standard 91 that is mounted upon the table 37 and the bearing balls 92 that are interposed between the raceways. The gear 88 thus rotatably mounted is fixed upon and surrounds a sleeve or enlarged hub portion 93 that carries ears 94 through which abutment screws 95 are passed. The shaft 9 that supports the blade holder carries a collar split into halves 96, these halves being clamped together and upon the shaft by means of clamping bolts 97. Each half of the split collar carries an ear 98 interposed between a pair of abutment screws 95, there being two pairs of ears 94 on opposite sides of the shaft which carry two pairs of abutment screws on opposite sides of the shaft in positions to receive the ears 98 therebetween. The bore of the sleeve or hub portion 93 of the gear 88 is sufficiently large to accommodate the largest blade holder or the largest shaft 9 supporting the same that may be a part of the grinding machine, temporarily or otherwise. The turning movement which is imparted to the gear 88 through the intermediation of the gears between it and the shaft 82 is imparted to the shaft 9 and the blade holders thereon through the intermediation of the abutment screws 95 and the split collar 96 clamped upon the shaft. To relieve the conical bearings 33 of the tail stocks of excessive strain which is imposed upon the shaft 9 in the grinding operation, I provide a bearing to supplement said cone bearings to engage the shaft 9 closer to the grinding region, such supplemental bearing also serving to prevent distortion of the shaft while the grinding operation is in progress. This supplemental bearing is desirably in the form of radial jaws 99 which are formed with radial slots 100 through which the shanks of bolts 101 are passed, these bolt shanks being screwed into a carrier 102 that is rigidly assembled with the standard 91. When the bolts 101 are loosened the jaws may be readily adjusted to have centering engagement with the shaft 9. After the adjustment has been effected it is maintained by tightening said bolts. As an aid in effecting the adjustment of the jaws, follower bolts 103, in threaded engagement with extensions 104 of the carrier 102, have abutting engagement with the outer faces of the jaws and are readily disposed so that as they are inwardly turned they may effect the inward movement of the jaws to the selected positions whereafter the bolts 101 are tightened to maintain the adjustment of the jaws thus effected.

The action of the selected cam 57 in controlling the longitudinal movement of the shaft 9 and the blade holder will now be further described in connection with Figs. 10 and 13 to 27 inclusive. The grinding wheel and blade holder rotate in opposite directions as indicated by the arrows in different figures. The substantially fixed point $d$ is the point of grinding contact of the wheel, the grinding action commencing slightly below such point $d$. As the blade holder continues to turn and move longitudinally in the grinding operation, the point of grinding contact of the wheel at the line of the cutting edge of the blade gradually rises from a little below the point $d$ until the backoff is completed and the circular arc 4 (which is the constant portion of the line of the cutting edge and which cutting edge portion lies in the desired cylindrical area), is reached, the point of grinding contact remaining at this upper level until the constant portion 4 of the cutting edge has been ground whereafter the point of grinding contact gradually lowers to a position that is slightly lower than the point $d$ and at which the grinding of the lead portion 5 of the cutting edge of the blade is finished.

Reference letters are employed in Figs. 12 to 27 inclusive which diagrammatically correspond to similarly lettered parts in Fig. 10. Referring particularly to Fig. 19, the backoff portion of the cutting edge is ground while the cam roller 61 is riding upon the portion of the cam 57 that is above the dot and dash line $z$ and between this line and the dot and dash line $z'$. The constant portion of the cutting edge is ground while the cam roller 61 is riding upon the portion of the cam 57 that is upon the right of the dot and dash line $z'$ and between this dot and dash line and the dot and dash line $z^2$. The actual grinding operation occurs while the portion of the cam 57 that is shown in Fig. 19 as being above the line $z$ and to the right of the line $z^2$ is riding upon the roller 61. The longitudinal movement of the shaft 9 that occurs during the grinding operation commences when the point $z^4$ of the cam 57 enters into engagement with the cam roller 61 and is concluded when the point $z^5$ of the cam is leaving the cam roller. The return motion of the shaft 9, in the non-grinding operation, occurs between the points $z^5$ and $z^6$ of the cam. When the cam roller is in engagement with the portion of the cam between the points $z^6$ and $z^4$ the longitudinal movement of the shaft 9 ceases preparatory to the resumption of its longitudinal movement for the grinding operation upon the ensuing blade. The dot and dash curved lines within the perimeter of the cam 57 in Fig. 19 are drawn to show what would be the shape of the cam if the cutting edge of the blade did not have any backoff or any lead but had only a direction from end to end that was coincident with the constant direction of the portion 4 of the cutting edge so that the entire cutting edge would, if the cam were so modified, lie within a cylindrical surface. The bulging of the cam beyond the dot and dash lines within the perimeter of the cam, Fig. 19, are the cam formations which cause the recession toward the axis of such cylindrical surface of the ends of the cutting edge.

The broad features of the invention disclosed herein are claimed in my copending application Serial No. 109,222 filed May 15, 1926, which is a continuation in part of the present application.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A blade sharpening machine including a grinding wheel; a revolving blade holder serving to present the blade that is to be sharpened to said wheel; and mechanism for defining a line of grinding contact conforming, in part, to an elongated blade crown and a portion receding from such crown in the plane of the blade at each end thereof, the plane of rotation of the grinding wheel where it is in grinding contact with the blade being substantially in a cord of the circle of rotation of the ground blade edge.

2. A blade sharpening machine including a grinding wheel; a revolving blade holder serving to hold the blade oblique to the axis of rotation of said holder; and mechanism for defining a line of grinding contact that lies partially in a cylindrical area and in an area tapering from said cylindrical area throughout each end portion of the blade.

3. A blade sharpening machine including a grinding wheel; a revolving blade holder serving to hold the blade oblique to the axis of rotation of said holder; and mechanism for moving said holder longitudinally of its axis while the cutting edge of the blade is being ground in a manner to shape said cutting edge to lie partially in a cylindrical area and in an area tapering from said cylindrical area throughout each end portion of the blade, the plane of rotation of the grinding wheel where it is in grinding contact with the blade being substantially in a cord of the circle of rotation of the ground blade edge.

4. A blade sharpening machine including a grinding wheel; a revolving blade holder serving to hold the blade oblique to the axis of rotation of said holder; and mechanism for defining a line of grinding contact that lies partially in a cylindrical area and in an area tapering from said cylindrical area throughout each end portion of the blade, the grinding wheel being also so positioned that its blade contacting portion will pass over the blade substantially at right angles to its cutting edge.

5. A blade sharpening machine including a grinding wheel; a revolving blade holder serving to hold the blade oblique to the axis of rotation of said holder; and mechanism for moving said holder longitudinally of its axis while the cutting edge of the blade is being ground in a manner to shape said cutting edge to lie partially in a cylindrical area and in an area tapering from said cylindrical area throughout each end portion of the blade, the plane of grinding contact of the grinding wheel with the blade being substantially in a cord of the circle of rotation of the ground blade edge, the grinding wheel being also so positioned that its blade contacting portion will pass over the blade substantially at right angles to its cutting edge.

6. A blade sharpening machine including a grinding wheel; a revolving blade holder serving to present the blade that is to be sharpened to said wheel; and mechanism for defining a line of grinding contact conforming, in part, to an elongated blade crown and a portion receding from such crown in the plane of the blade at each end thereof, the plane of rotation of the grinding wheel where it is in grinding contact with the blade being substantially in a cord of the circle of rotation of the ground blade edge and inclined with respect to the blade holder for clearance.

7. A blade sharpening machine including a grinding wheel; a revolving blade holder serving to hold the blade oblique to the axis of rotation of said holder; and mechanism for moving said holder longitudinally of its axis while the cutting edge of the blade is being ground in a manner to shape said cutting edge to lie partially in a cylindrical area and in an area tapering from said cylindrical area throughout each end portion of the blade, the plane of grinding contact of the grinding wheel with the blade being substantially in a cord of the circle of rotation of the ground blade edge, the plane of rotation of the grinding wheel being inclined with respect to the blade holder for clearance, the grinding wheel being also so positioned that its blade contacting portion will pass over the blade substantially at right angles to its cutting edge.

8. A blade sharpening machine comprising, in combination, a grinding wheel, a revolving blade holder serving to hold a blade oblique to its axis of rotation, the axis of said grinding wheel being inclined downwardly and laterally relative to the axis of said holder, and mechanism for moving said holder longitudinally of its axis at a variable rate of speed in one direction to present said blade to the effective cutting area of said wheel in a manner to shape the cutting edge of said blade to lie partially in a cylindrical area and partially in an area departing from said cylindrical area.

9. A blade sharpening machine having, in combination, a grinding wheel, a continually revolving work holder serving to hold a blade oblique to its axis of rotation, said grinding wheel being inclined downwardly and laterally relative to the axis of said holder to present a portion thereof as its effective grinding area, and means for reciprocating said holder longitudinally of its axis to present said blade to said grinding wheel in a manner such that the point of engagement thereof with said grinding wheel shifts slightly at each end of the cutting stroke.

10. A blade sharpening machine having, in combination, a rotary work holder serving to hold a blade, a supporting member, a cylindrical member rotatably adjustable in said supporting member, a grinding wheel spindle eccentrically mounted in said cylindrical member and parallel to the axis thereof, said grinding wheel spindle being inclined downwardly and laterally with respect to the axis of the holder, means for adjusting said cylindrical member, and mechanism for moving said work holder longitudinally of its axis while the cutting edge of said blade is being ground in a manner to shape the same to lie partially in a cylindrical area and partially in area tapering from said cylindrical area.

11. A blade sharpening machine having, in combination, a grinding wheel, a revolving holder serving to hold a plurality of blades oblique to the axis of rotation of said holder, said grinding wheel being inclined laterally to present one edge as its effective grinding area, and inclined downwardly to avoid interference with the blades adjacent the one being ground, and means for reciprocating said holder longitudinally to present said blades successively to the effective grinding area of said wheel, the reciprocation during each cutting stroke being variable to shift the point of grinding contact at certain points along the cutting edge of each blade.

12. A blade sharpening machine having, in combination, a grinding wheel, a revolving blade holder serving to hold a plurality of spaced blades oblique to the axis of rotation of said holder, said grinding wheel spindle being inclined laterally to provide clearance in grinding each blade and downwardly to avoid interference with adjacent blades, and means for reciprocating said holder axially in timed relation to the rotation thereof to automatically present successive blades to said wheel, the speed of reciprocation being slightly varied during each grinding stroke to grind an offset portion on each blade.

13. A blade sharpening machine comprising, in combination, a cup-shaped grinding wheel, a blade holder serving to hold a blade oblique to its axis of rotation, the plane of rotation of said grinding wheel being inclined with respect to said blade holder, means for effecting a relative reciprocatory movement axially of said holder between said grinding wheel and said holder, and means connected to said first mentioned means for rotating said holder in predetermined relation to said reciprocation, said means serving to vary said relationship at predetermined points in the cutting stroke to shift the point of engagement of said blade with said grinding wheel.

14. A blade sharpening machine comprising, in combination, an annular grinding wheel, a blade holder serving to hold a blade oblique to its axis of rotation, said grinding wheel being positioned with a diameter in line with said blade and being inclined about said diameter, and mechanism for revolving said holder and for effecting a relative reciprocation between said grinding wheel and said holder axially of said holder, said mechanism being operable to vary the rate of said reciprocation in one direction during the cutting stroke to present said blade to different points on said grinding wheel in a manner to obtain a predetermined contour.

15. In a grinding machine, in combination, a grinding wheel, a blade holder having a blade inclined to its axis, means for rotating said blade holder, and means for reciprocating said blade holder across said grinding wheel, said last mentioned means including a table for supporting said blade holder, a plurality of cams of different shapes and cam follower means adjustable on said table for selective cooperative engagement with said cams.

16. In a grinding machine, in combination, a grinding wheel, a work holder, a table, stocks on said table for supporting the work holder arbor, mechanism for reciprocating said table, and mechanism connected to said first mentioned mechanism for rotating said arbor, said last mentioned mechanism comprising a gear housing through which the arbor extends, gear means connected to said arbor, and means for centering said arbor intermediate its ends.

In witness whereof, I hereunto subscribe my name this 25th day of July A. D., 1921.

GERARD A. DE VLIEG.